Aug. 31, 1937.　　　　F. J. SCHWIMMER　　　　2,091,934
VALVE ACTUATOR MECHANISM
Filed Aug. 14, 1935　　　2 Sheets-Sheet 2
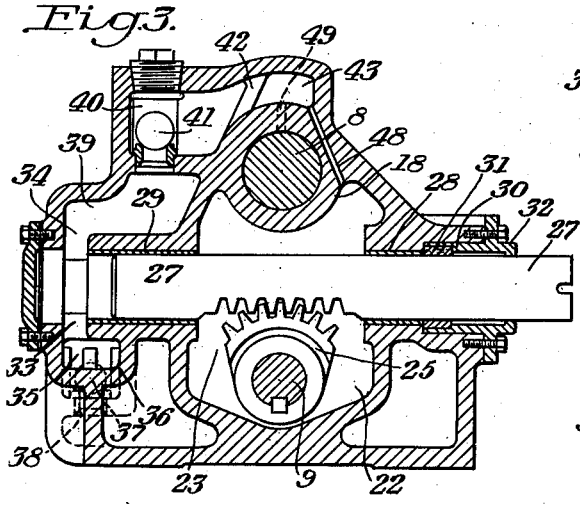
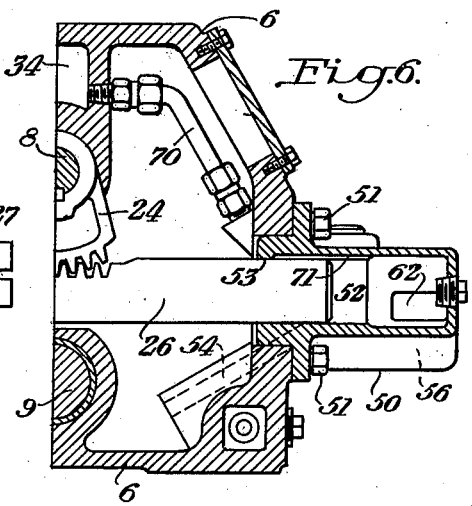
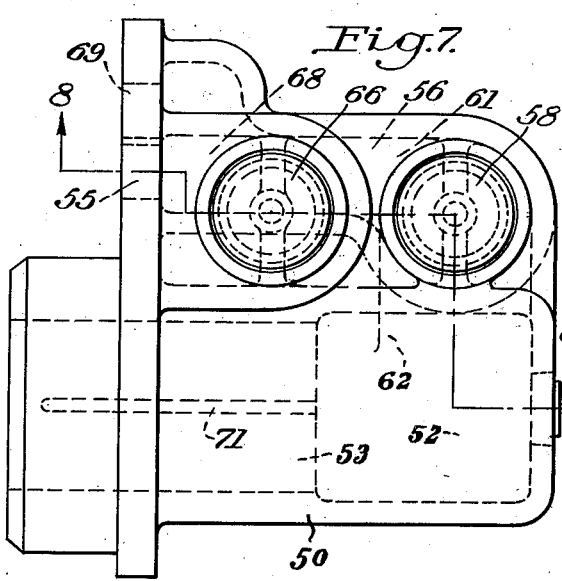
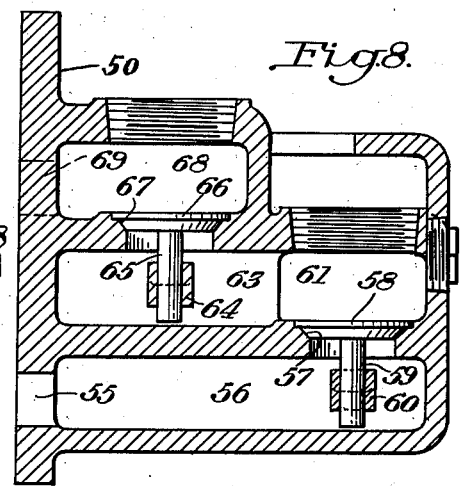
INVENTOR
Frederick J. Schwimmer
BY
Edward A. Lawrence
ATTORNEY Patented Aug. 31, 1937

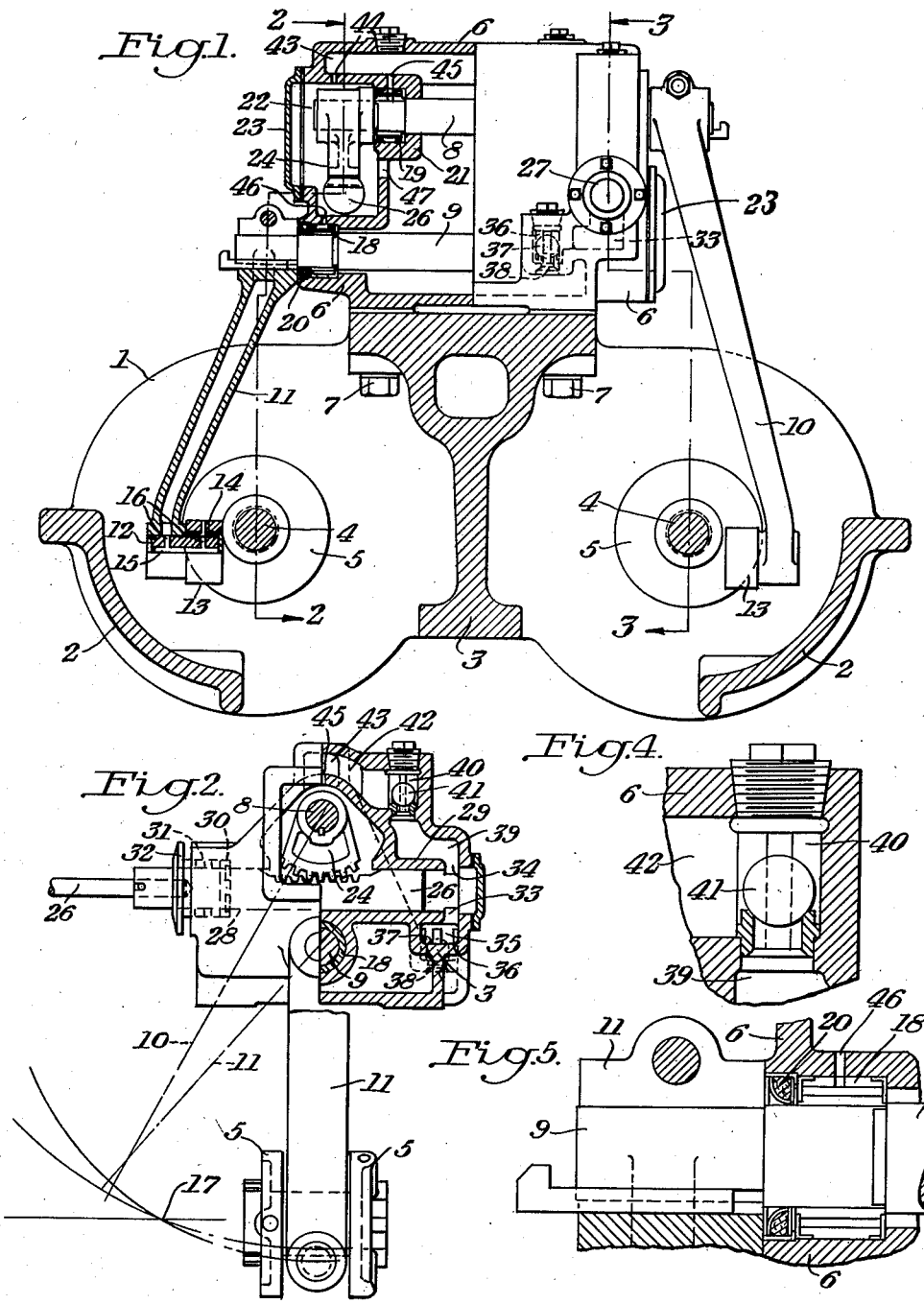

2,091,934

UNITED STATES PATENT OFFICE 2,091,934

VALVE ACTUATOR MECHANISM

Fredrick J. Schwimmer, Toledo, Ohio, assignor to The National Supply Company of Delaware, Toledo, Ohio, a corporation of Delaware Application August 14, 1935, Serial No. 36,115

11 Claims. (Cl. 121—114)

This invention relates generally to valve actuating mechanism for reciprocating engines and more particularly to valve actuating mechanisms of the rocker type.

This invention may be conveniently applied, for instance, to operate the valves of a duplex engine wherein the movement of the piston rods is employed by the valve operating mechanism to operate the valves controlling said pistons.

As herein illustrated, my invention is shown applied to a duplex slush pump which is generally used to circulate fluid in a well during rotary drilling operations. Pumps of this type generally employ a crank arm; one end of which is operated by the movement of a piston rod and the other end is arranged to operate a valve rod through a connecting link. Owing to the arcuate movement of the crank arms the valve rod connecting link may be only axially aligned with the valve rod at one position in the stroke. This type of valve actuating mechanism is exposed or open and very difficult to lubricate. The angular movement of the link in operating the valve rod results in wear of the connections and the packing of the valve rod.

The object of my invention is to dispense with the crank arms and link valve rod connections and to employ an improved mechanical movement that will produce reciprocating motion in axial alignment with the valve rod. By dispensing with the link connection the problem of lubrication is minimized and the wear on the valve rod packing eliminated. Also a rigid and permanent structure may be constructed for completely housing in the actuating mechanism so that it may be properly lubricated.

Another object of my invention is the provision of a self contained lubricating system within the valve operating mechanism.

This object may be accomplished by providing a lubricating reservoir within the valve operating mechanism and means for circulating the lubricant to the bearings carrying the moving parts. This I accomplish by employing the valve rods themselves as pump pistons for circulating the lubricant within the valve operating mechanism.

Other novel features and advantages of my invention will appear hereinafter.

In the accompanying drawings in which I have illustrated a practical embodiment of the principles of my invention without limiting the claimed invention thereto, Fig. 1 is a sectional view of a duplex engine showing applied thereto the valve operating mechanism shown partly in section and partly in elevation.

Fig. 2 is a view partly in section taken along the lines 2—2 of Fig. 1.

Fig. 3 is a sectional view taken along the lines of 3—3 of Fig. 1.

Fig. 4 is an enlarged sectional view of one of the check valves shown in Fig. 2.

Fig. 5 is an enlarged sectional view of one of the rocker shaft bearings shown in Fig. 1.

Fig. 6 is a sectional view similar to Fig. 2 showing a modification of my pump.

Fig. 7 is a plan view of the pump casing shown in Fig. 6.

Fig. 8 is a sectional view taken along the lines 8—8 of Fig. 7.

Referring now to the drawings, and more particularly to Figs. 1 to 5, 1 represents a twin head casting of the steam cylinders in a duplex steam engine which is connected to the pump portion of the engine by means of the quarter round frames 2 and the center frame 3. The piston rods 4 are provided with the ordinary guide plates 5 for operating the valve crank mechanism.

6 represents the housing for the valve operating mechanism, which housing is secured to the upper surface of the center frame 3 by means of the bolts 7. The housing 6 has journaled therein the rocker shafts 8 and 9. The axes of these shafts lie in a vertical plane. These shafts are operated by the piston rods 4 through the rocker arms 10 and 11 respectively which are keyed thereto. The free end of each rocker arm is provided with a stub shaft 12 which rotatably supports the rollers 13 on suitable bearings 14. The stub shafts are provided with the passageways 15 and the connecting vents 16 for the purpose of lubricating the bearing surfaces. The rollers 13 are held between the guide plates 5 on the piston rods 4 with sufficient clearance to permit engagement with the driving plate only. Reciprocation of the piston rods 4 moves the rocker arms 10 and 11 in an arc, thereby rocking the shafts 8 and 9.

Since the shaft 8 is above the shaft 9 and their axes are in the same vertical plane and since the axes of the piston rods 4 are in the same horizontal plane the rocker arm 10 must necessarily be longer than the rocker arm 11. The arcs scribed by the axes of the stub shafts 12, upon movement of the arms 10 and 11, intersect the horizontal plane of the piston rods 4 substantially directly opposite to one another as shown by the point 17 in Fig. 2.

18 and 19 represent bearings secured within the housing 6 for carrying the rocker shafts 8 and 9. The bearings 18 are in the outer wall of the housing 6 adjacent the arms 10 and 11 and are provided with the packing element 20 which prevents the escape of oil to the exterior of the casing.

The bearings 19 support the opposite ends of the shafts 8 and 9 within the inner walls 21 of the gear chambers 22. These chambers are enclosed from the exterior by the plates 23. This structure avoids the necessity of packing the bearings 19 and also provides for proper support for said shafts.

The ends of the shafts 8 and 9, which extend into the gear chambers 22, have secured thereto the sector gears 24 and 25 respectively which are arranged to engage the rack sections of the valve rods 26 and 27. Since the shaft 8 is above and the shaft 9 is below the valve rods 26 and 27 the sector gear 24 extends downwardly to engage the rack on the upper side of the rod 26 as shown in Fig. 1 and the sector gear 25 extends upwardly to engage the rack on the underside of the rod 27 as shown in Fig. 3. Owing to the difference in length of the rocker arms 10 and 11 the sector gear 25 has a shorter radius than the sector gear 24 to provide the same stroke length for the valve rod 27 as provided for the valve rod 26. This is quite apparent in Fig. 2 which shows the arcs of the rocker arms having chords of equal lengths yet the angle subtended by the arc scribed by the arm 11 is greater than the angle scribed by the arm 10.

The valve rods 26 and 27 are supported within the housing 6 in the aligned bearings 28 and 29. Rod packing chambers 30 are provided in the housing 6 adjacent the bearings 28. Each packing chamber is provided with the packing member 31 and the gland member 32.

The portion of the valve rods 26 and 27 that reciprocate within the housing is larger in diameter than that which extends to the steam valves. The advantage of this design is twofold. The large diameter rods provide adequate material for cutting the rack thereon. Again the free ends of the inner section of the rods are cylindrical and have a sliding fit within the bearings 29 which also act as lubricating pump cylinders. The ends of the cylinders are enclosed with a cap plate and are provided with the intake ports 33 and the exhaust ports 34. The ports 33 are connected by the passageways 35 to the valve chambers 36. The valve chambers 36 are provided with valve seats to receive the upwardly opening ball valves 37 which close the inlet passageways 38 between the valve chamber and the lower portion of the housing 6.

The discharge ports 34 are connected by the passageways 39 to the valve chambers 40 in the upper portion of the housing 6. These chambers are provided with valve seats to receive the valve balls 41 which check the passage of fluid from the chambers 40 to the passageways 39.

The valve chambers 40 are connected by the passageways 42 to the overflow chambers 43 at the very top of the housing 6 and which open into the common space within the housing, the lower part of which acts as an oil sump.

The floors of the overflow chambers 43 are provided with the passageways 44 and 45 which direct a portion of the oil into the gear chambers 22 and the bearings 19 from whence it is collected in the bottom of the chambers 22, forming a lubricant bath for the valve rods and sector gears. The chamber 22 housing the gear 24 is provided with a single passage 46 at the bottom thereof to permit the oil to lubricate the bearing 18 therebelow from whence it passes to the main reservoir. This chamber is also provided with the overflow port 47 which permits the excess oil therein to flow to the main reservoir in the bottom of the housing 6. The chamber 22 housing the gear 24 is provided with oil passageway 48 fed from the overflow passage 43. The bearing 18 supporting the shaft 8 is provided with the oil passageway 49. Both of these passageways contribute oil to the chamber 22 where it is collected until it overflows to the main reservoir of the housing.

Referring to Figs. 6 to 8 wherein I have illustrated a modification of my invention, 50 represents a detachable circulating pump arranged to be secured to the housing 6 by the bolts 51. The pump is provided with a bore 52 having the bearing 53 arranged to receive the reciprocating valve actuating rods 26 or 27. The main reservoir of the housing 6 is provided with the passageway 54 leading to the intake port 55 at one end of the passage 56 of the pump 50.

57 represents a valve seat at the other end of the passage 56 arranged to be closed by the valve 58 whose stem 59 is carried by the valve stem guide 60.

The chamber 61 above the valve 58 is connected to the bore 52 by the port 62 and is also connected to one end of the passage 63. 64 is a valve stem guide in the passage 63 for carrying the valve stem 65 of the valve 66 which is arranged to engage and close the valve seat 67.

The chamber 68 above the valve 66 is connected to the housing 6 by the port 69. The housing 6 is provided with the pipe 70 which connects the port 69 to the overflow chamber 34 as shown in Fig. 6.

The top of the bearing 53 is provided with the groove 71 which permits the passage of oil from the bore 52 to lubricate the valve rods as they reciprocate in the bearing.

The valves 58 and 66 check the flow of oil back to the reservoir in the housing 6. When the valve rods move to the left in Fig. 6 within the bearing 53 they draw oil past the valves 58 into the bores 52 and when they reverse moving to the right they displace the oil drawn therein and force it past the valves 66 from whence it travels through the passageways 70 to the overflow 34.

The valve actuating mechanism in the housing 6 is lubricated as previously described in relation to Figs. 1 to 5.

With this design of a valve operating mechanism the use of a link connection between the rocker shaft stand and the valve rod is eliminated. Such link connections are generally open between the steam chest and the stand and are the cause of considerable wear and frequent failure due to inadequate lubrication. It is impossible to maintain uniform lubrication in a link structure. Applicant's improvement avoids all of these difficulties and provides a more efficient operating mechanism.

Steam pumps provided with D type slide valves are frequently operated under high steam pressure and as the D valves are not generally of the balanced type the pressure of the steam imposes a considerable pressure load on the valve rod in its effort to move the valve across the ported deck in the steam chest. The use of applicant's rack and pinion arrangement for actuating the valve rods eliminates the objectional link connections and bearings which must transmit the load through angular connections.

I claim:—

1. A valve actuating mechanism for reciprocating engines, the combination of a bearing support, a valve rod journaled in said bearing support and adapted for axial movement to impart reciprocating motion to a valve, a rocker shaft journaled in said bearing support adjacent said valve rod for oscillating the latter and having its axes positioned normal to said valve rod, journal bearings for said valve rod and rocker shaft, gearing for transmitting motion from said rocker shaft to said valve rod including rack gear teeth on said valve rod and a gear element mounted on said rocker shaft and adapted to mesh with said rack teeth, said bearing support constituting a lubricant reservoir in which are positioned said valve rod and rocker shaft journal bearings, a lubricant circulating pump comprising the said valve rod, functioning as a pump piston within said valve rod journal bearing opening, and a valve chamber in direct communication with said opening and valves in said valve chamber to control the suction and discharge therefrom, for delivering lubricant to said bearings.

2. In a steam pump comprising aligned steam and pump cylinders, a valve for the steam cylinder and a valve rod arranged for longitudinal reciprocation to operate said valve, a pump for supplying lubrication to moving parts and comprising a barrel and inlet and outlet valves, the end of the valve rod being arranged to work in the barrel to form the piston of the lubricant pump.

3. In a duplex pump comprising pairs of aligned steam and pump cylinders, pistons in said cylinders, a piston rod connecting the pistons of each pair of cylinders, a valve for each of the steam cylinders and a valve rod for each valve and actuated by the opposite piston rod, and a pump for supplying lubrication to the moving parts and comprising a barrel and inlet and outlet valves, the end of one of the valve rods being arranged to work in the barrel to form the piston of the lubricant pump.

4. In a duplex pump comprising pairs of aligned steam and pump cylinders, pistons in said cylinders, a piston rod connecting the pistons of each pair of cylinders, a valve for each of the steam cylinders and a valve rod for each of said valves and arranged for longitudinal reciprocation, the combination of a housing, spaced aligned bearings in said housing for supporting each of the valve rods, and operative connections between the opposite piston rods and the valve rods to actuate the latter.

5. In a duplex pump comprising pairs of aligned steam and pump cylinders, pistons in said cylinders, a piston rod connecting the pistons of each pair of cylinders, a valve for each of the steam cylinders and a valve rod for each of said valves and arranged for longitudinal reciprocation, the combination of a housing, spaced aligned bearings in said housing for supporting each of the valve rods, a rocker shaft for each of said valve rods journaled in said housing, said rocker shafts being actuated by opposite piston rods, and operative connections between each of said rocker shafts and one of said valve rods to actuate the latter.

6. In a duplex pump comprising pairs of aligned steam and pump cylinders, pistons in said cylinders, a piston rod connecting the pistons of each pair of cylinders, a valve for each of the steam cylinders and a valve rod for each of said valves and arranged for longitudinal reciprocation, the combination of a housing, spaced aligned bearings in said housing for supporting each of the valve rods, and operative connections between the opposite piston rods and the valve rods to actuate the latter, said connections engaging the valve rod intermediate of its aligned bearings.

7. In a duplex pump comprising pairs of aligned steam and pump cylinders, pistons in said cylinders, a piston rod connecting the pistons of each pair of cylinders, a valve for each of the steam cylinders and a valve rod for each of said valves and arranged for longitudinal reciprocation, the combination of a housing, spaced aligned bearings in said housing for supporting each of the valve rods, a rocker shaft for each of said valve rods journaled in said housing, said rocker shafts being actuated by opposite piston rods, and operative connections between each of said rocker shafts and one of said valve rods to actuate the latter, said connections engaging the valve rod intermediate of its aligned bearings.

8. In a duplex pump comprising pairs of aligned steam and pump cylinders, pistons in said cylinders, a piston rod connecting the pistons of each pair of cylinders, a valve for each of the steam cylinders and a valve rod for each of said valves and arranged for longitudinal reciprocation, the combination of a housing, spaced aligned bearings in said housing for supporting each of the valve rods, and operative connection between the opposite piston rods and the valve rods to actuate the latter, the housing forming a reservoir for lubricating said bearings and operative connections.

9. In a duplex pump comprising pairs of aligned steam and pump cylinders, pistons in said cylinders, a piston rod connecting the pistons of each pair of cylinders, a valve for each of the steam cylinders and a valve rod for each of said valves and arranged for longitudinal reciprocation, the combination of a housing, spaced aligned bearings in said housing for supporting each of the valve rods, a rocker shaft for each of the valve rods journaled in said housing, said rocker shafts being actuated by opposite piston rods, and operative connections between each of said rocker shafts and one of said valve rods to actuate the latter, the housing forming a reservoir for lubricating said bearings and operative connections.

10. In a duplex pump comprising pairs of aligned steam and pump cylinders, pistons in said cylinders, a piston rod connecting the piston of each pair of cylinders, a valve for each of the steam cylinders and a valve rod for each of said valves and arranged for longitudinal reciprocation, the combination of a housing, spaced aligned bearings in said housing for supporting each of the valve rods, operative connections between the opposite piston rods and the valve rods to actuate the latter, and a pump for supplying lubrication to moving parts comprising a barrel with inlet and outlet valves, the end of a valve rod being arranged to work in the barrel to form the piston of the lubricant pump.

11. In a duplex pump comprising pairs of aligned steam and pump cylinders, pistons in said cylinders, a piston rod connecting the piston of each pair of cylinders, a valve for each of the steam cylinders and a valve rod for each of said valves and arranged for longitudinal reciprocation, the combination of a housing, spaced aligned bearings in said housing for supporting each of the valve rods, operative connections between opposite piston rods and the valve rods to actuate the latter, said connections engaging the valve rods between their aligned bearings, and a pump for supplying lubrication to moving parts comprising a barrel with inlet and outlet valves, the end of a valve rod being arranged to work in the barrel to form the piston of the lubricant pump.

FREDRICK J. SCHWIMMER.